UNITED STATES PATENT OFFICE.

BRUNO RICHARD SEIFERT, OF RADEBEUL, NEAR DRESDEN, GERMANY, ASSIGNOR TO DR. F. VON HEYDEN NACHFOLGER, OF SAME PLACE.

CREOSOTE COMPOUND.

SPECIFICATION forming part of Letters Patent No. 501,235, dated July 11, 1893.

pplication filed February 9, 1893. Serial No. 461,674. (Specimens.) Patented in England November 24, 1890, No. 19,071; in Germany March 2, 1891, No. 60,716; in Belgium March 9, 1891, No. 94,068, and in Italy March 24, 1891, XXXIX, 99.

*To all whom it may concern:*

Be it known that I, BRUNO RICHARD SEIFERT, of Radebeul, near Dresden, in the Kingdom of Saxony, German Empire, have invented a certain new and useful Medical Compound, of which and of its manufacture the following is a specification, and for which I have obtained patents in the following countries: Germany, by patent of addition, No. 60,716, dated March 2, 1891; Belgium, by brevet de perfectionnement, No. 94,068, dated March 9, 1891; Great Britain, by Patent No. 19,071, dated November 24, 1890; Italy, by attestato completivo, Vol. XXXIX, No. 99, dated March 24, 1891.

My invention which is obtained by the treatment of creosote is a superior substitute for that compound for medical purposes.

Creosote, as is well known, is a liquid, acting strongly caustic and therefore poisonous, smelling strongly and disagreeably, having a strong burning taste and an acidulous reaction. I have taken away by my present invention all these noxious and injurious qualities from the creosote, by converting it into the compound hitherto unknown, which contains the phenols, of which the creosote consists (such as guaiacol, kreosol, kresol, &c.,) in form of carbonic acid ether. The new compound may therefore also be designated as "creosote chemically united with carbon dioxid" in contradistinction to free creosote.

The said compound is a colorless, or only very slightly colored, thick, semi-fluid oil, insoluble in water, readily soluble in alcohol and ether and having the following advantages in comparison with the creosote. It is neutral, without smell, not caustic, and almost non-poisonous and it has not any burning taste, perhaps sometimes slightly bitter. By treating it with soda lye (solution of hydrate of soda) it is decomposed into creosote and carbonic acid.

This new and useful compound may be produced from creosote in many different ways, for instance, by treating creosote with phosgene whereby the said compound and a hydrochloride are formed, or by heating creosote with ethers of carbonic acid, such as carbonate of diethyl or carbonate of diphenyl, whereby the said compound and alcohol and phenol are formed; or by treating carbonyl-chlorid of creosote with creosoted alkali whereby the said compound and an alkaline chlorid are formed.

Creosote is, as is well known, a mixture of different phenols, mainly guaiacol, kreosol and kresol. By the term carbonyl-chloride of creosote a product is to be understood which is obtained, if the (OH) of these phenols is replaced by the group (OCOCl). The carbonyl-chloride of creosote therefore is a mixture mainly of carbonyl-chlorid of guaiacol

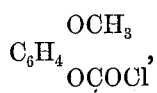

carbonyl chlorid of creosol

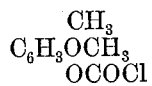

&c. It is formed by treatment of creosote with phosgene. The creosote-alkali is the mixture of guaiacol-alkali, creosol alkali, &c., which is formed if creosote is neutralized by caustic alkali (HNaOHKO, &c.) The alkaline chlorid is NaCl and KCl.

The simplest process of producing the new compound is the following: Creosote is dissolved in soda lye or in any other alkali. This solution is treated in a vessel at ordinary temperature with phosgene. Thereby there are formed chlorids of alkalies which remain dissolved and my compound of creosote and carbon dioxid which separates as an insoluble oil. As soon as this separation of the said compound ceases to increase, the treatment with phosgene is stopped. The creosote-carbonate is then decanted from the aqueous liquid and is washed first with a soda solution or with diluted soda lye and afterward with water and is finally dried by being heated in an open vessel.

The said compound having the above specified qualities serves as a superior substitute for medical creosotes.

What I claim as my invention, and desire to secure by Letters Patent, is—

The new compound derived from creosote and carbon dioxid which is a thick semi-fluid oil, insoluble in water, soluble in alcohol and ether, neutral, not caustic, without smell and without the burning taste of the free creosote, and decomposable by soda lye into creosote and carbonic acid, substantially as set forth.

In testimony that I claim the foregoing as my invention I have signed my name in presence of two subscribing witnesses.

BRUNO RICHARD SEIFERT.

Witnesses:
GEORG RICHTER,
WILHELM WIESENHÜTTER.